United States Patent [19]

Robinson

[11] 4,293,064
[45] Oct. 6, 1981

[54] ROLL CONVEYOR

[75] Inventor: James A. L. Robinson, Fayetteville, N.Y.

[73] Assignee: Syracuse Supply Company, Syracuse, N.Y.

[21] Appl. No.: 139,573

[22] Filed: Apr. 11, 1980

[51] Int. Cl.³ .................... B65G 17/00; B65G 17/24
[52] U.S. Cl. ................................................. 198/779
[58] Field of Search ............................ 198/779, 648

[56] References Cited

U.S. PATENT DOCUMENTS

| | | | |
|---|---|---|---|
| 3,406,810 | 10/1968 | Blair | 198/779 |
| 3,568,823 | 3/1971 | Rettig | 198/779 |
| 3,605,993 | 3/1970 | Rozario | 198/779 |
| 3,715,024 | 2/1973 | Mumma | 198/779 |
| 3,894,627 | 7/1975 | Jabbusch | 198/779 |
| 4,142,624 | 3/1979 | Diver et al. | 198/779 |

Primary Examiner—Robert B. Reeves
Assistant Examiner—B. Bond

Attorney, Agent, or Firm—Bruns & Jenney

[57] ABSTRACT

A conveyor system for transporting articles through a generally planar conveying zone. The system includes a coacting pair of endless drive chains that are moved in unison through the conveying zone. Rollers are equally spaced along the length of each chain with the rollers in one row being axially aligned with the rollers in the second row along common axes of rotation that are perpendicular to the direction of motion of the chains. Light weight hollow cylinders are seated on top of the chain with the cylinders resting in contact with two adjacent rollers in each row. A guide means extends along the chains's path of travel from the end of the conveying zone to the start thereof and serves to hold the cylinders in contact with the rollers as the chains are being returned to the start of the conveying zone. Actuating means are also provided to impart a prescribed motion to the cylinders while they are in the conveying zone for further controlling the speed of an article passing therethrough.

14 Claims, 6 Drawing Figures

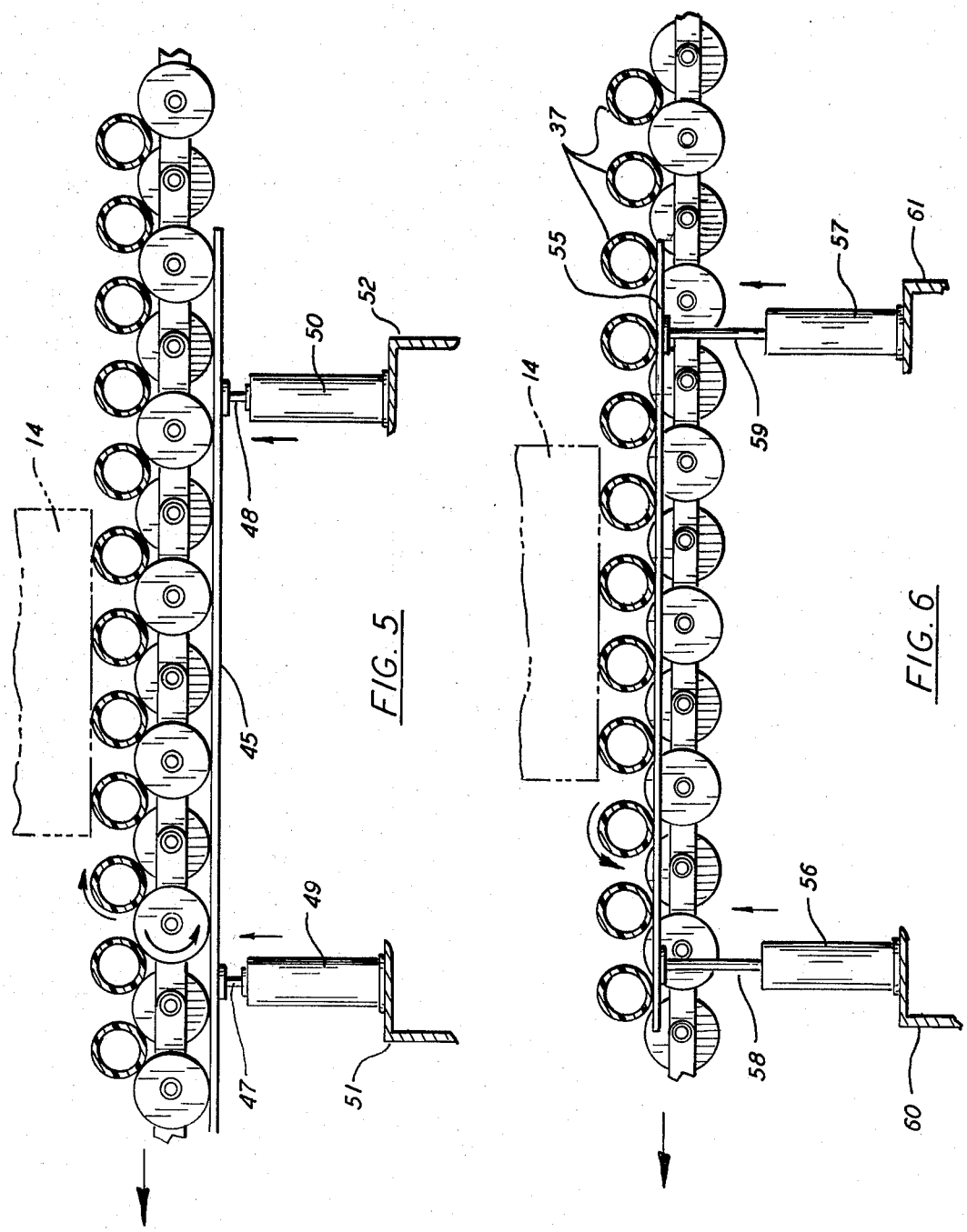

ROLL CONVEYOR

BACKGROUND OF THE INVENTION

This invention relates to a roll type conveyor system of transporting articles along a generally linear path of travel and, in particular, to a simple and compact conveyor that is capable of safely providing a number of speed adjusting functions while using a minimum number of moving parts.

Many roll type conveyors are in use today which have the ability of controlling the speed of an article in transit. Although these conveyors for the most part operate quite well, these machines are generally rather heavy and space consuming devices that utilize complex and expensive roller mechanisms. Because of the size and weight involved, special precautions sometimes must be taken to adequately support the equipment in a building or the like which add to the overall expense of the equipment.

In U.S. Pat. No. 3,894,627, a moving roll conveyor is described that has the ability to adjust the speed of the article support rollers and thus the speed of an article situated thereon.

In order to maintain separation between articles, the conveyor rollers are subdivided into individual flights. Each flight contains a number of nonpowered or idler rollers that are interposed between driven or powered rollers. The powered rollers positioned forward of the idlers in the direction of conveyor travel are rotated in a direction so as to move an article situated thereover rearwardly toward the idlers. The powered rollers positioned behind the idlers are turned in the opposite direction so as to push an article situated thereover forward toward the idlers. Accordingly, articles riding on the conveyor tend to assume a center position in each flight thereby establishing a uniformly spaced file of articles traveling along the conveying path.

Although a number of different speeds can be imparted to an article in transit by this prior art device, it should be noted that the speed functions are not selectively programmable. Consequently, one article can very well move out of one flight into an adjacent flight thereby disturbing the spacing of the articles in transit. Similarly, in the event the forward progress of one article is slowed or stopped, the faster moving articles that follow will contact the slower moving articles causing a chain reaction. When delicate articles are being conveyed, this type of chain reaction can cause breakage. It should be noted that all of the rollers in each flight are secured to the drive chain. Each of the rollers thus requires a pair of relatively heavy end caps for engaging the chains. It is also well known in the art that closely spaced, positively driven, rollers of this nature are capable of grabbing and holding the limbs and clothing of persons using the conveyor. Oftentimes bodily harm results before the machinery can be shut down.

U.S. Pat. No. 2,154,844 also discloses a roll type conveyor for transporting test tubes through a number of work stations. The tubes are laid laterally on top of two rows of travelling discs. In operation, pressure is applied to either the discs or the tubes to impart a prescribed rotational motion to the work as it passes through the various work stations. Here again, the apparatus is rather bulky and complex requiring a large number of cooperating parts to achieve the desired results.

SUMMARY OF THE INVENTION

It is an object of the present invention to improve conveyor systems for transporting articles in file through a conveying zone.

A further object of the present invention is to provide for the safety of persons using a roll type conveyor for transporting articles over a predetermined path of travel.

A still further object of the present invention is to reduce the size and weight of roll type conveyors.

Another object of the present invention is to provide a relatively inexpensive roll conveyor of the type used to transport articles over a planar path of travel.

Yet another object of the present invention is to provide a versatile roll conveyor that can be selectively programmed by an operator to carry out a number of different speed-related functions.

Yet a still further object of the present invention is to provide a moving roll type conveyor which automatically prevents articles in transit from becoming damaged in the event one article is slowed down or stopped while in the conveying zone.

These and other objects of the present invention are attained by means of a conveyor system having a pair of coacting transport members that are arranged to move in unison through a conveying zone. Equally-spaced rollers are mounted along each drive member to provide two axially aligned rows of rollers. Light weight, hollow, cylinders are seated across the two rows of rollers with each cylinder resting in contact against two adjacent rollers in each row. As the drive members move through the conveying zone, the cylinders are pushed along by the rollers to create a moving platform capable of transporting articles situated thereupon.

BRIEF DESCRIPTION OF THE DRAWINGS

For a better understanding of these and other objects of the present invention, reference is had to the following detailed description of the invention which is to be read in conjunction with the accompanying drawings, wherein:

FIG. 5 is an enlarged section taken along lines 5—5 in FIG. 1 illustrating a control means for selectively imparting a rotational motion to rollers secured to the sprocket chain; and FIG. 6 is a partial side elevation illustrating a second control means for selectively imparting a rotational motion to the cylinders seated upon the sprocket chain rollers.

DESCRIPTION OF THE INVENTION

Figure 1:
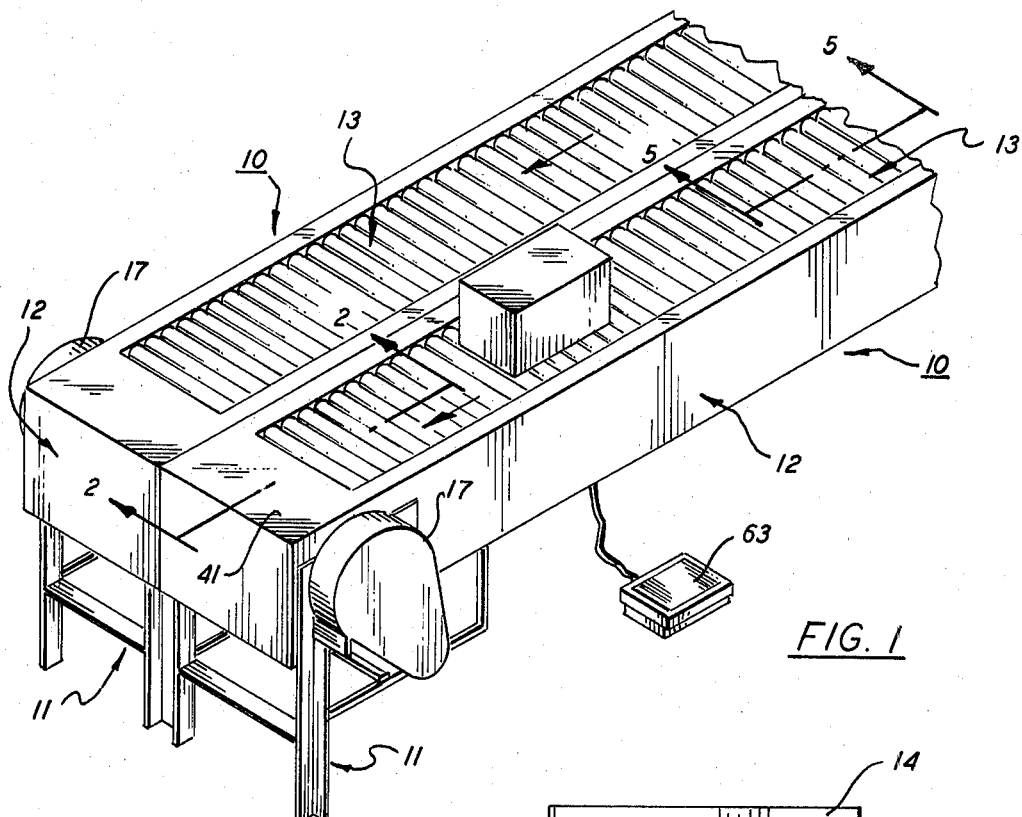
FIG. 1 is a partial perspective view showing two individual conveyor systems embodying the teachings of the present invention situated in an abutting side-by-side relationship.

Referring initially to FIG. 1 there are illustrated two individual conveying machines, each being generally referenced 10, that are positioned in abutting side-by-side relationship. Each machine includes a welded support frame 11, an outer cover 12 made up of flat panels for providing the machine with a smooth contoured outer surface, and a roll conveyor transport system 13 mounted in the frame for conveying articles, such as container 14, through a planar conveying zone situated in the top portion of the machine frame. As will be described in further detail below, the conveyor transport system is powered by an electric motor (not shown) that is adapted to turn a sprocket wheel drive 15 through means of a conventional belt and sheave mechanism housed within a belt guard 17.

Figure 2:
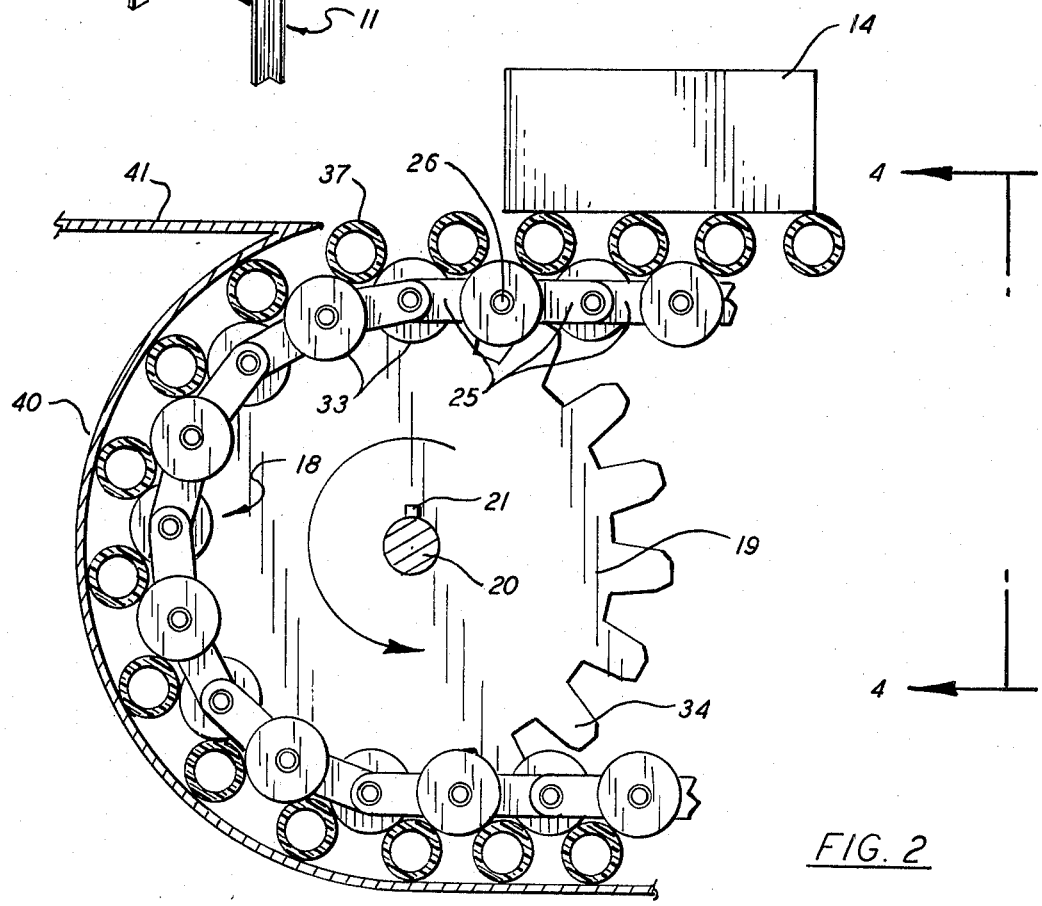
FIG. 2 is an enlarged section taken along lines 1—1 in FIG. 1 showing a sprocket chain and drive mechanism utilized in the conveyor systems.
Figure 3:
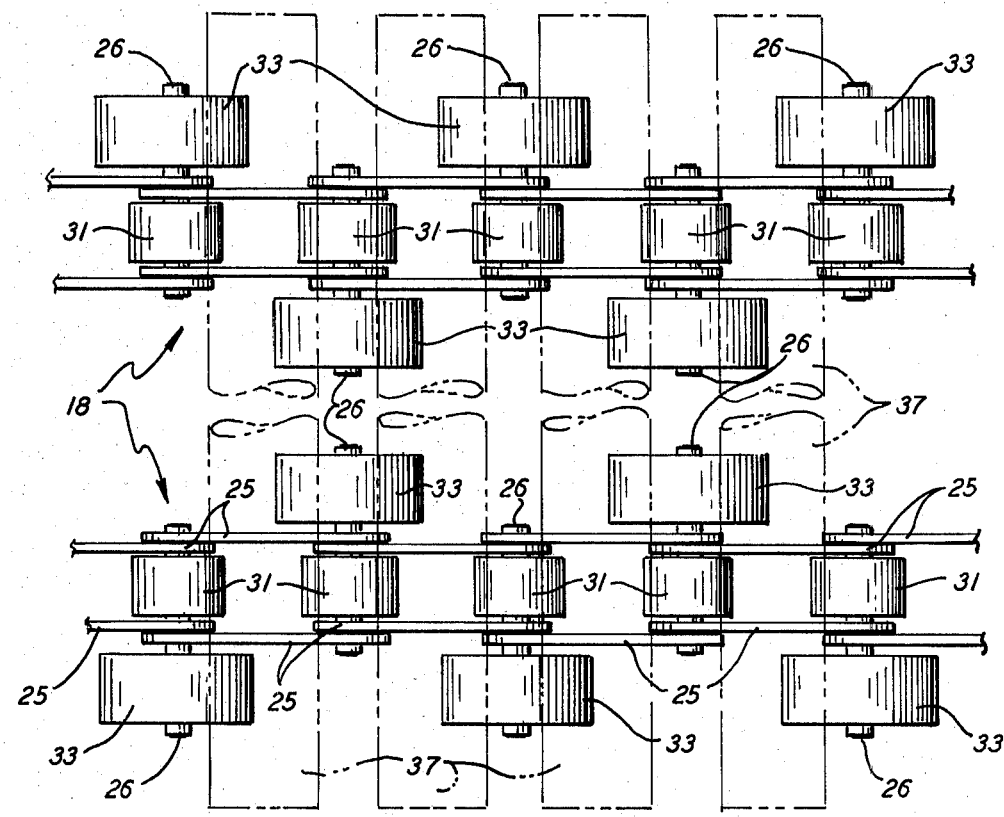
FIG. 3 is a partial top plan view of one of the sprocket chains employed in the practice of the present invention and further illustrating a number of cylinders seated in parallel alignment thereon.
Figure 4:
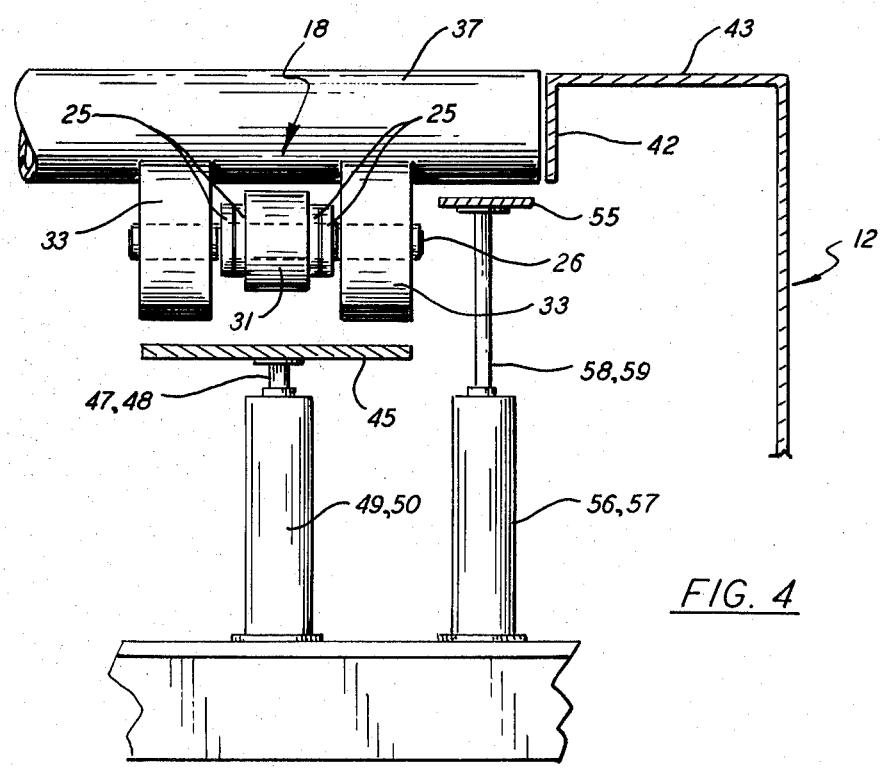
FIG. 4 is a partial end view of the drive chain shown in FIG. 3 which is taken along lines 4—4.

With further reference to FIGS. 2-4, wherein like elements are identified by like numbers, the roll conveyor transport system 13 includes a pair of parallelly aligned sprocket drive chains 18—18 of similar construction. Each chain is driven by a pair of drive sprockets 19—19 that are coaxially secured to a single drive shaft 20 via keys 21—21. In view of the fact that both sprocket drive chains and wheels are identical as to structure and function, the construction of only one of the chain assemblies will be described in greater detail.

As best seen in FIG. 3, each chain includes a number of coacting pin links 25—25 that are joined by pivot pins 26—26. The links making up each chain are arranged in two parallel flights with the flights being separated by trunnions 31—31. The trunnions, in turn, are rotatably supported upon each of the pivot pins. The pivot pins are of greater length than the width of the chain and are arranged so that the pins alternately extend outwardly from either side of the chain. Rollers 33 are rotatably supported upon the extended ends of the pins whereby the rollers in assembly are staggered to one side or the other of the chain. The rollers are of an equal diameter that is greater than the width of the chain link so that at least a portion of each roller protrudes beyond the top and bottom surfaces of the chain. By use of the staggered roller arrangement, rollers having a diameter greater than the center distance between the pivot pins can be mounted upon each chain.

Each drive sprocket wheel contains a number of equally-spaced teeth that are arranged to move between the chain trunnions as the wheels are rotated by the drive mechanism. The wheels thus are able to engage the chains in a positive, non-slip manner to drive the chains, and thus the rollers, forward over the predetermined path of travel. Although not shown, a similar pair of idler sprockets are horizontally aligned with the drive sprockets within the frame to guide the chains over the upper horizontal run that defines the conveying zone.

A series of hollow, elongated cylinders 37—37 are laterally disposed over the chains to provide a moving transport that is adapted to pass through the conveying zone as illustrated by the arrow in FIG. 1. In assembly, the cylinders are seated between adjacent rollers on each chain with the axis of the cylinders being generally perpendicular to the direction of motion of the conveyor. It should be noted that the cylinders are not secured to the chain but are merely resting upon the rollers. Accordingly, the cylinders can be easily removed from the assembly and pose little or no danger to those using the conveyor. As best seen in FIG. 2, a guide element 40 is mounted in the frame adjacent to the chain's path of travel that extends from the end of the conveying zone back to the start of the conveying zone. The guide is situated in the frame so that the cylinders moving through this region contact the inside surface thereof and are prevented from being unseated from the rollers when brought below the horizontal centerline of the system. Side guides are also provided to contain the rollers in lateral alignment upon the chains. As seen in FIG. 4, the side guide 42 positioned adjacent to the conveying zone can depend from the outer cover 12 thereby providing the machine with extremely clean lines. The top surface 43 of the cover plates is slightly below the top surface of the conveyor cylinders to prevent the articles in transit from becoming jammed against the cover plate.

An exit ramp 41 is positioned at the end of the conveying zone onto which the articles in transit are deposited as the cylinders dip below the horizontal plane of the upper chain run.

Preferably the hollow cylinders are constructed of relatively lightweight, high strength plastic that is capable of supporting relatively heavy articles without appreciable bending. The rollers can also be constructed of a low durometer plastic having a high coefficient of friction whereby the rollers are able to cradle the cylinders therebetween in positive driving contact as they pass through the conveying zone.

With further reference to FIGS. 5 and 6, there is shown means for controlling the rotational activity of the cylinders as they are being transported along a linear path of travel through the conveying zone to provide both a stop function and a speed-up function to the conveyor system without altering or otherwise terminating the motion of the conveyor drive system. As best illustrated in FIGS. 4 and 5, a pair of parallel roller control rails 45—45 are reciprocally mounted in the machine frame below the two rows of rollers being drawn through the conveying zone. The rails are longitudinally disposed along the chain's path of travel so that they subtend a number of rollers on each chain. The rails are supported at each end on push rods 49 and 50. The push rods are reciprocally contained within tubular mounts 49 and 50 that are secured by suitable means to structural elements 51 and 52 located inside the loop of the endless chains. The push rods are driven along a reciprocal path of travel by means of solenoids contained within the tubular mounts. Accordingly, when the solenoids are activated, the roller control rails are driven upwardly into contact with both sets of rollers thereby causing the rollers to be rotated in a counterclockwise direction as viewed in FIG. 5. This, in turn, imparts a clockwise motion to the cylinders being drawn by the chains over the roller control rails. An article 14 that is mounted upon the cylinders over the rails is moved rearwardly at the same rate that the chain is traveling thus holding the article in a stationary position.

The contact surfaces of the rails may be rubberized to increase the traction between the rails and the rollers. It should also be recognized that a hydraulic or mechanical drive can be substituted for the electrical solenoid drive herein disclosed without departing from the teachings of the present invention.

With further reference to FIGS. 4 and 6, a second set of cylinder control rails 55—55 are reciprocally supported beneath the extended outboard ends of the cylinders which lie outside of the side margins of the two chains. Here again, each of the cylinder control rails is powered via solenoid assemblies 56 and 57 acting through push rods 58 and 59. Stationary structural elements 60 and 61 provide reaction surfaces against which the solenoid acts. By raising the cylinder control rails into contact with the cylinders, the cylinders are caused to rotate in a counterclockwise direction as illustrated in FIG. 6. This causes an article seated upon the controlled cylinders to be driven forward in the direction of conveyor travel at twice the conveyor speed.

Referring once again to FIG. 1, positioning of the control rails can be controlled by a foot-operated treadle 50 having a switch means for selectively operating either of the two sets of solenoids. Accordingly, the operator can, at his option, create a stop region or a speed-up region within the conveying zone thus providing the system with a wider degree of operability. It should also be clear to one skilled in the art that the rails used to control the cylinders and rollers may also be moved linearly along endless tracts while they are in contact with the respective rotating elements and thus more closely control the article's speed as it passes through the various control regions.

As should now be evident, the conveying apparatus of the present invention is not only safe to use but is also relatively simple in construction. It should be also noted that the present conveyor has the unique ability of automatically holding articles in a file in their respective positions in the event one of the articles is inadvertently slowed down or stopped. Faster moving articles that come into contact with the slower moving or stopped articles will simply assume the speed of the slower articles. Any slight speed retarding force exerted on the cylinders by the articles will set the cylinders in motion. Accordingly, when the article in transit is moving at a slower speed, the cylinders contacting the article will roll along the bottom surface of the article to automatically compensate for whatever speed differential exists between the article and the chain driven rollers. As a result, uncontrollable jamming up of the articles and possible breakage of fragile goods is avoided by the present device.

While this invention has been described with specific reference to the embodiment herein disclosed, it should be evident that the present invention is broad enough to cover any modifications that come within the scope of the following claims.

I claim:

1. Apparatus for conveying articles that includes
    a frame having a planar conveying zone situated in the top portion thereof,
    an endless transport movably mounted within said frame having a flat upper run which passes through the conveying zone,
    two parallel rows of equally-spaced rollers rotatably supported in the endless transport for movement therewith wherein the rollers in one row are axially aligned with the rollers in the other row along a common axis of rotation that is perpendicular to the path of travel of said endless transport, and
    a series of elongated cylinders seated upon the top of the endless transport over the two rows of rollers, said cylinders resting in contact with two adjacent rollers in each row whereby the cylinders create a moving platform within the conveying zone.

2. The apparatus of claim 1 that further includes a guide means mounted in the frame adjacent to the endless path of travel of said transport with the guide extending from the terminal end of said conveying zone in the direction of conveyor travel to the start of the conveying zone, said guide being positioned in the frame to hold the cylinders in contact with said rollers.

3. The apparatus of claim 1 that further includes side margin plates mounted within said frame that are positioned adjacent to said endless path of travel of said transport for maintaining the cylinders in lateral alignment as they move therealong.

4. The apparatus of claim 1 that further includes a first control means mounted inside the endless path of travel of said transport for engaging a series of rollers in rolling contact therewith as the rollers pass through the conveying zone whereby a motion is imparted to the cylinders for retarding or stopping articles situated thereupon.

5. The apparatus of claim 4 that further includes a first actuating means operatively connected to said first control means for moving said first control means into and out of engagement with said rollers.

6. The apparatus of claim 1 that further includes a second control means positioned beneath the cylinders supported on said transport for engaging a series of said cylinders in rolling contact as they are moving through the conveying zone whereby a motion is imparted to the cylinders for increasing the speed of an article situated thereupon.

7. The apparatus of claim 6 that further includes a second actuating means operatively connected to said second control means for moving said second control means into and out of engagement with said cylinders.

8. A conveyor for transporting articles through a predetermined conveying zone including
    a frame,
    a pair of spaced-apart, parallelly-aligned sprocket drive chains that are movably mounted between sprocket wheels within said frame for moving the chains in unison through an endless path of travel that includes a planar upper run defining the conveying zone,
    each of said drive chains being formed of connected links that are pivotably joined together by means of equally-spaced pivot pins,
    a roller rotatably mounted upon each of said pivot pins adjacent to one of the outer side walls of the chain, said roller being of a diameter that is greater than the width of the links,
    a series of cylinders perpendicularly aligned upon the chains so that each cylinder rests in contact against two adjacent rollers on each of said chains, and
    guide means positioned adjacent to the endless path of travel of said chains which extends in the direction of chain travel from the end of the conveying zone back to the start of the conveying zone for holding the cylinders in contact with said roller.

9. The conveyor of claim 8 that further includes side margin plates mounted within said frame on either side of the conveying zone for maintaining the cylinders in lateral alignment as they move through the conveying zone.

10. The conveyor of claim 8 wherein the rollers mounted upon each chain are alternately positioned on either side of the supporting chain.

11. The conveyor of claim 8 wherein the cylinders are elongated hollow members formed of a high strength plastic.

12. The conveyor of claim 8 wherein the rollers are formed of a material having a high coefficient of friction.

13. The conveyor of claim 8 that further includes a first friction means movably mounted in the frame so that it is selectively positionable into and out of driving engagement with a number of rollers on the chains as the rollers pass through th conveying zone to impart a first motion to the cylinders.

14. The conveyor of claim 13 that further includes a second friction means movably mounted in the frame that is selectively positionable into and out of driving engagement with a number of said cylinders as the cylinders pass through the conveying zone to impart a second motion to the cylinders.

* * * * *